Patented Oct. 24, 1944

2,360,898

UNITED STATES PATENT OFFICE 2,360,898

SOFTENERS FOR SYNTHETIC RUBBER

Donald V. Sarbach, Cuyahoga Falls, Ohio, assignor to The B. F. Goodrich Company, New York, N. Y., a corporation of New York No Drawing. Application September 12, 1941, Serial No. 410,596

9 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft plastic condition in which it may readily be compounded and processed. Accordingly it is necessary to employ softeners or plasticizers in order to improve its compounding and processing characteristics. The selection of suitable softeners for synthetic rubber has, however, presented numerous difficulties particularly in the case of synthetic rubber of the type prepared by the copolymerization of a butadiene-1,3 hydrocarbon and an acrylic nitrile. These difficulties are accentuated by the fact that many softeners ordinarily employed in rubbery or resinous materials are incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered a new class of softeners which are compatible with any of the synthetic rubbers prepared by the polymerization of a butadiene-1,3 hydrocarbon either alone or in admixture with other polymerizable compounds. Moreover these new softeners impart to synthetic rubber certain desirable properties which do not ordinarily accompany the use of softeners and which have heretofore been difficult to obtain.

This new class of softeners comprises terpene ethers of the type

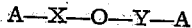

wherein X is a cyclic terpene hydrocarbon nucleus containing ten carbon atoms, Y is a hydrocarbon nucleus containing from 1 to 10 carbon atoms and A is a member of the class consisting of hydrogen, hydroxyl groups and —OR groups where R is a hydrocarbon radical containing from 1 to 10 carbon atoms. Included in this class of terpene ethers there may be mentioned (1) the alkyl ethers of monohydric terpene alcohols of either the monocyclic or dicyclic series wherein the alkyl group contains from 1 to 10 carbon atoms such as the methyl, ethyl, propyl, isopropyl, butyl, isobutyl, amyl, hexyl, 2-ethyl hexyl and octyl ethers of menthol, isomenthol, tetrahydrocarveol, the various terpineols, the terpinenols, menthenols, thujyl alcohol, sabinol, carol, verbenol, verbanol, borneol, fenchyl alcohol, isofenchyl alcohol and the like; (2) the alkyl ethers of dihydric terpene alcohols of either the monocyclic or bicyclic series wherein the alkyl group contains from 1 to 10 carbon atoms and wherein either or both of the hydroxyl groups are etherified such as the monoalkyl or di-alkyl ethers of the various terpins, 3,4-menthene glycol, p-menthane-2,8 diol, pinene glycols, pinol and the like; (3) the alkenyl, aralkyl and cyclic ethers of monohydric and dihydric terpene alcohols wherein the alkenyl, aralkyl or cyclic group contains from 1 to 10 carbon atoms such as the allyl, propenyl, benzyl, cyclopentyl, cyclohexyl and cyclohexenyl ethers of the terpene alcohols mentioned hereinabove; (4) monoethers or diethers of terpene alcohols with dihydric alcohols containing from 1 to 10 carbon atoms such as the ethers of the terpene alcohols mentioned hereinabove with ethylene glycol, propylene glycol and the like; (5) ethers of terpene alcohols with ether alcohols such as the ethers of the terpene alcohols mentioned hereinabove with ethoxy ethanol, butoxy ethanol, methoxy propanol and the like; and (6) ethers of terpene alcohols with the same or other terpene alcohols such as diterpinyl ethers, difenchyl ether and the like and other ethers of the type hereinabove set forth.

Some of these ethers may be prepared by the direct etherification of a terpene alcohol with another alcohol containing from 1 to 10 carbon atoms but many of these ethers, the so-called additive terpene ethers, are most conveniently prepared by coupling an alcohol containing from 1 to 10 carbon atoms with any of the various unsaturated terpene hydrocarbons such as the terpinenes, terpinolenes, limonenes, phellandrene, sylvestrene, dipentene, pinenes, camphene, bornylene or the like or mixtures containing these such as are found in turpentine, pine oil, etc. Mixtures of terpene ethers or relatively pure terpene ethers prepared in this manner or by hydrogenating terpene ethers prepared in this manner are commercially available and are ordinarily employed in the practice of this invention.

Typical examples of compound which may be employed as softeners in this invention together with structural formulae for some of these compounds are found in the following list:

Menthyl methyl ether

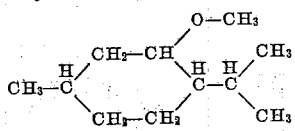

Thujyl propyl ether

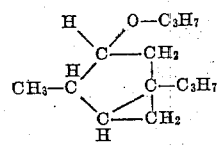

Bornyl butyl ether

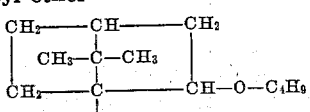

1,8-dimethoxy menthane

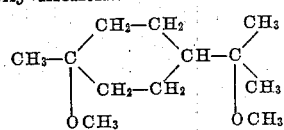

Alpha-terpinyl methyl ether

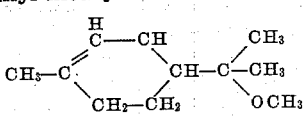

1-methoxy menthane-8-ol

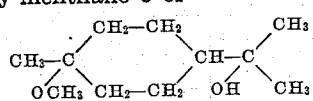

Alpha-terpinyl benzyl ether

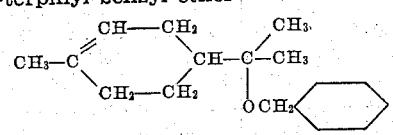

Alpha-terpinyl glycol ether

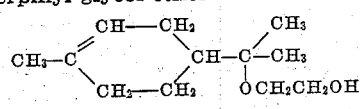

Fenchyl ethoxy ethyl ether

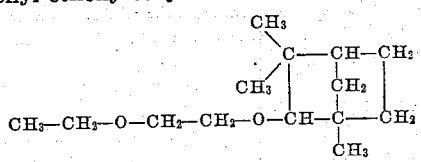

Difenchyl ether

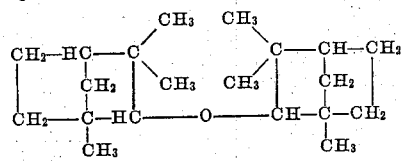

Additive ether prepared from methyl alcohol+ alpha-pinene

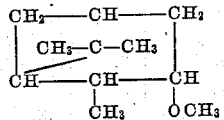

Other additive ethers prepared from

Ethylene glycol+pinene
Methyl alcohol+terpinolene
Ethyl alcohol+phellandrene
Methyl alcohol+pine oil
Ethylene glycol+turpentine
butyl alcohol+dipentene As mentioned hereinabove these terpene ethers may be employed as softeners for synthetic rubber prepared by the polymerization of a butadiene-1,3 hydrocarbon, by which is meant butadiene-1,3 and its homologs which polymerize in essentially the same manner such as isoprene, 2,3-dimethyl butadiene-1,3, piperylene, etc., either alone or in admixture with other butadiene-1,3 hydrocarbons or with other unsaturated monomers copolymerizable therewith. Among such unsaturated monomers copolymerizable with a butadiene-1,3 hydrocarbon to form synthetic rubber there may be mentioned the aryl olefins such as styrene and vinyl naphthalene, the alpha methylene carboxylic acids and their esters, nitriles and amides such as acrylic acid, methyl acrylate, methyl methacrylate, acrylonitrile, methacrylonitrile, methacrylamide and the like, isobutylene, methyl vinyl ether, methyl vinyl ketone, vinylidene chloride and other unsaturated hydrocarbons, esters, alcohols, acids, ethers, etc., which contain the polymerizable structure $$CH_2=C\diagup_{\diagdown}$$

where at least one of the disconnected valencies is attached to an electro-active group, that is, a group which substantially increases the electrical dissymmetry or polar character of the molecule. The polymerization to form a synthetic rubber may be accomplished by any of the well known methods such as homogenous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent.

The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber but amounts smaller or larger than this ranging from 1 to 100 parts of softener for each 100 parts of synthetic rubber are also effective. With synthetic rubber prepared by the copolymerization of butadiene and styrene or of butadiene and acrylic esters it is possible to use smaller amounts of softener than are required with rubber prepared by the copolymerization of butadiene and an acrylic nitrile.

As a representative example of this invention a synthetic rubber composition containing one of the softeners hereinabove disclosed is prepared as follows: A batch consisting of 100 parts by weight of a synthetic rubber prepared by copolymerizing in aqueous emulsion, 55 parts by weight of butadiene and 45 parts by weight of acrylonitrile is broken down on a roll mill at 120°–130° F. 50 parts by weight of terpinyl methyl ether (the methyl ether of a mixture of terpineols consisting principally of alpha-terpineol) are then added as fast as the softener is absorbed by the copolymer. Although the softener requires about 30 minutes to be added to the synthetic rubber the milling properties of the rubber are greatly improved by the addition of the softener. The softened composition finally obtained is quite plastic and in addition it possesses excellent tack. When this composition is mixed with the conventional pigments, sulfur, and a vulcanization accelerator and then vulcanized, a vulcanizate having an ultimate elongation of over 1000% and a high rebound elasticity is obtained.

Similar synthetic rubber compositions possessing excellent tack, high elongation and excellent resilience may be obtained by incorporating other terpene ethers in this class with other synthetic rubbers of the type prepared by the polymerization of a butadiene-1,3 hydrocarbon either alone or with other polymerizable compounds. For example, the alkyl ethers of terpene alcohols, the ethers prepared from alkyl monohydric alcohols and unsaturated terpene hydrocarbons and the ethers prepared from ethylene glycol and unsaturated terpene hydrocarbons all give good results in synthetic rubber prepared by the copolymerization of butadiene and acrylonitrile, of butadiene and styrene and of butadiene and methyl methacrylate.

Other materials such as natural rubber, other softeners, pigments, fillers, vulcanizing agents, accelerators, antioxidants, and the like may be included in the compositions herein described. Other modifications will be apparent to those skilled in the art and are within the spirit and scope of the invention as defined by the appended claims.

I claim:

1. A composition of matter comprising a synthetic rubber prepared by the polymerization of a butadiene-1,3 hydrocarbon and, as a softener therefor, a terpene ether of the formula

A—X—O—Y—A wherein X is a cyclic, ten-carbon atom, bivalent terpene hydrocarbon nucleus; Y is a bivalent hydrocarbon nucleus which bonds by either of its valences to an hydroxyl group and by the other to an hydrogen atom to form an alcohol and which contains from 1 to 10 carbon atoms; and A is a member of the class consisting of hydrogen, hydroxyl and —O—R groups where R is a monovalent hydrocarbon radical which bonds to an hydroxyl group to form an alcohol and which contains from 1 to 10 carbon atoms.

2. A composition of matter comprising a synthetic rubber prepared by the copolymerization of a butadiene-1,3 hydrocarbon and at least one other unsaturated compound which contains a

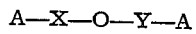

group and is copolymerizable therewith and, as a softener therefor, a terpene ether of the formula

A—X—O—Y—A wherein X is a cyclic, ten-carbon atom, bivalent terpene hydrocarbon nucleus; Y is a bivalent aliphatic hydrocarbon nucleus containing from 1 to 10 carbon atoms; and A is a member of the class consisting of hydrogen, hydroxyl and —O—R groups where R is a monovalent aliphatic hydrocarbon radical containing from 1 to 10 carbon atoms.

3. A composition of matter comprising a synthetic rubber prepared by copolymerizing a butadiene-1,3 hydrocarbon and at least one other unsaturated compound which contains a

group and is copolymerizable therewith and, as a softener therefor, an alkyl ether of a cyclic ten-carbon-atom terpene alcohol wherein the alkyl group contains from 1 to 10 carbon atoms.

4. A composition of matter comprising a synthetic rubber prepared by copolymerizing a butadiene-1,3 hydrocarbon and at least one other unsaturated compound which contains a

group and is copolymerizable therewith and, as a softener therefor, an ethylene glycol ether of a cyclic ten-carbon atom terpene alcohol.

5. A composition of matter comprising a synthetic rubber prepared by copolymerizing butadiene-1,3 and acrylonitrile and, as a softener therefor, an alkyl ether of a cyclic ten-carbon atom terpene alcohol wherein the alkyl group contains from 1 to 10 carbon atoms.

6. A composition of matter comprising a synthetic rubber prepared by copolymerizing butadiene-1,3 and acrylonitrile and, as a softener therefor, an alkyl ether of a terpineol.

7. A composition of matter comprising a synthetic rubber prepared by copolymerizing butadiene-1,3 and acrylonitrile and as a softener therefor, a terpinyl methyl ether.

8. A composition of matter comprising a synthetic rubber prepared by copolymerizing butadiene-1,3 and acrylonitrile and, as a softener therefor, an ethylene glycol ether of a terpineol.

9. A composition of matter obtained by vulcanizing in the presence of sulfur, a composition comprising a synthetic rubber prepared by the polymerization of a butadiene-1,3 hydrocarbon and, as a softener therefor, a terpene ether of the formula

A—X—O—Y—A where X is a cyclic, ten-carbon atom, bivalent terpene hydrocarbon nucleus; Y is a bivalent hydrocarbon nucleus which bonds by either of its valences to an hydroxyl group and by the other to an hydrogen atom to form an alcohol and which contains from 1 to 10 carbon atoms; and A is a member of the class consisting of hydrogen, hydroxyl and —O—R groups where R is a monovalent hydrocarbon radical which bonds to an hydroxyl group to form an alcohol and which contains from 1 to 10 carbon atoms.

DONALD V. SARBACH.